(12) United States Patent
Bowers

(10) Patent No.: US 6,527,623 B1
(45) Date of Patent: Mar. 4, 2003

(54) METHOD OF TREATING A SURFACE WITH HARD PARTICLES USING FREE RUNNING ROLLERS

(75) Inventor: Martin Robert Bowers, Madeley (GB)

(73) Assignee: Laystall Engineering Company Limited, Wolverhampton (GB)

( * ) Notice: Subject to any disclaimer, the term of this patent is extended or adjusted under 35 U.S.C. 154(b) by 126 days.

(21) Appl. No.: 09/697,537

(22) Filed: Oct. 26, 2000

Related U.S. Application Data

(63) Continuation-in-part of application No. 09/208,327, filed on Dec. 9, 1998, now abandoned.

(30) Foreign Application Priority Data

Aug. 8, 1998 (GB) .............................................. 9817237

(51) Int. Cl.$^7$ ................................................. B24B 1/00
(52) U.S. Cl. ............................. 451/36; 451/52; 451/54; 451/55; 451/60; 451/61
(58) Field of Search ............................. 451/36, 37, 51, 451/52, 54, 55, 60, 61, 29, 31

(56) References Cited

U.S. PATENT DOCUMENTS

| | | | |
|---|---|---|---|
| 3,171,189 A | 3/1965 | Hedgecock |
| 3,670,462 A | 6/1972 | Robinson |
| 3,961,104 A | 6/1976 | Tanner |
| 4,567,695 A | 2/1986 | Schaeffler |

FOREIGN PATENT DOCUMENTS

JP 62024956 A 2/1987

*Primary Examiner*—Timothy V. Eley
(74) *Attorney, Agent, or Firm*—Fulwider Patton Lee & Utecht, LLP

(57) ABSTRACT

A method of treating a surface of a component formed from a base material is described. The method comprises the steps of bringing the surface into proximity with free running rollers, the surface being moved relative to the free running rollers with a contact force in the range of 5.25 to 20.00 Newtons per mm of roller width, and introducing hard particles between the free running rollers and the surface such that at least some of the hard particles are forced into the base material of the surface by the free running rollers.

13 Claims, 3 Drawing Sheets

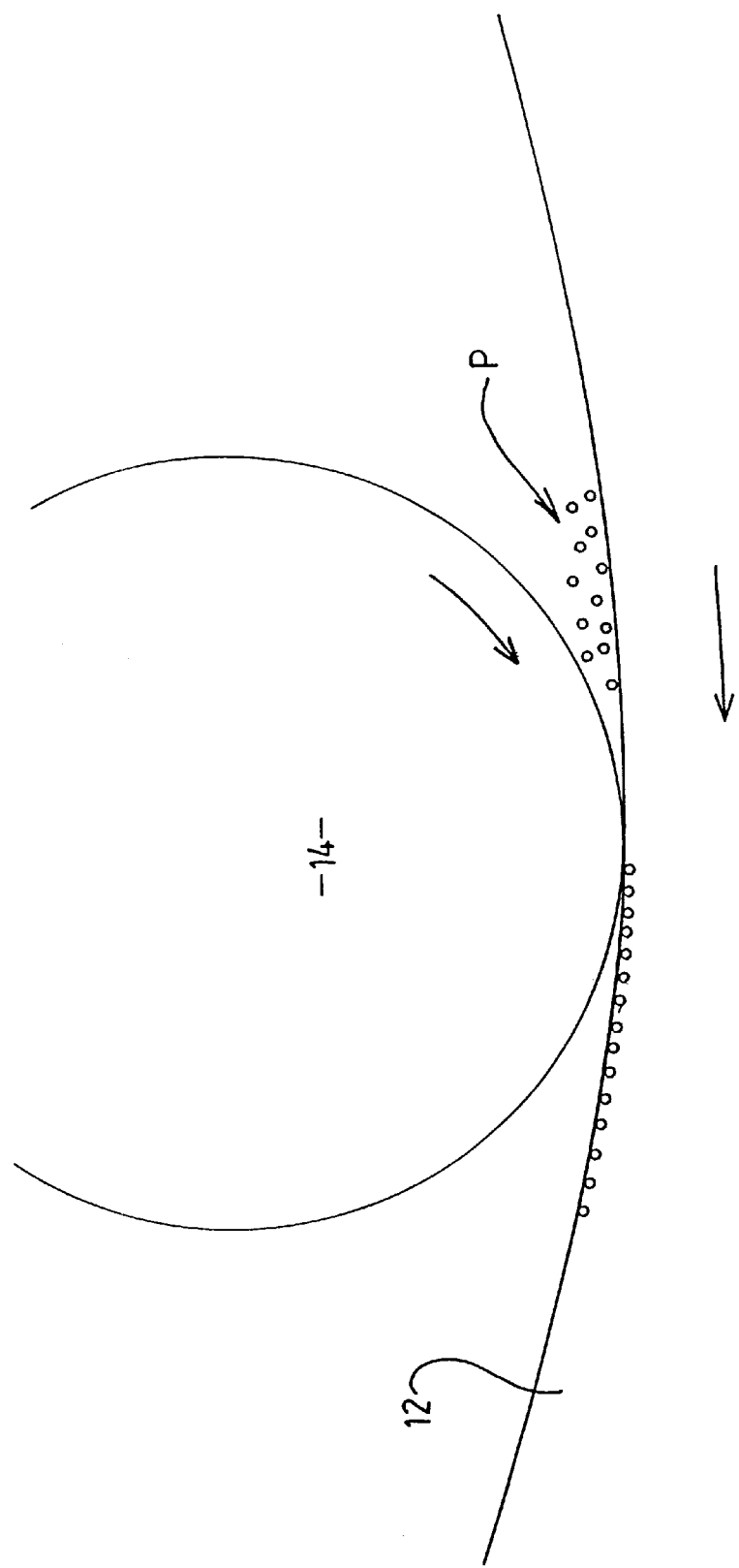

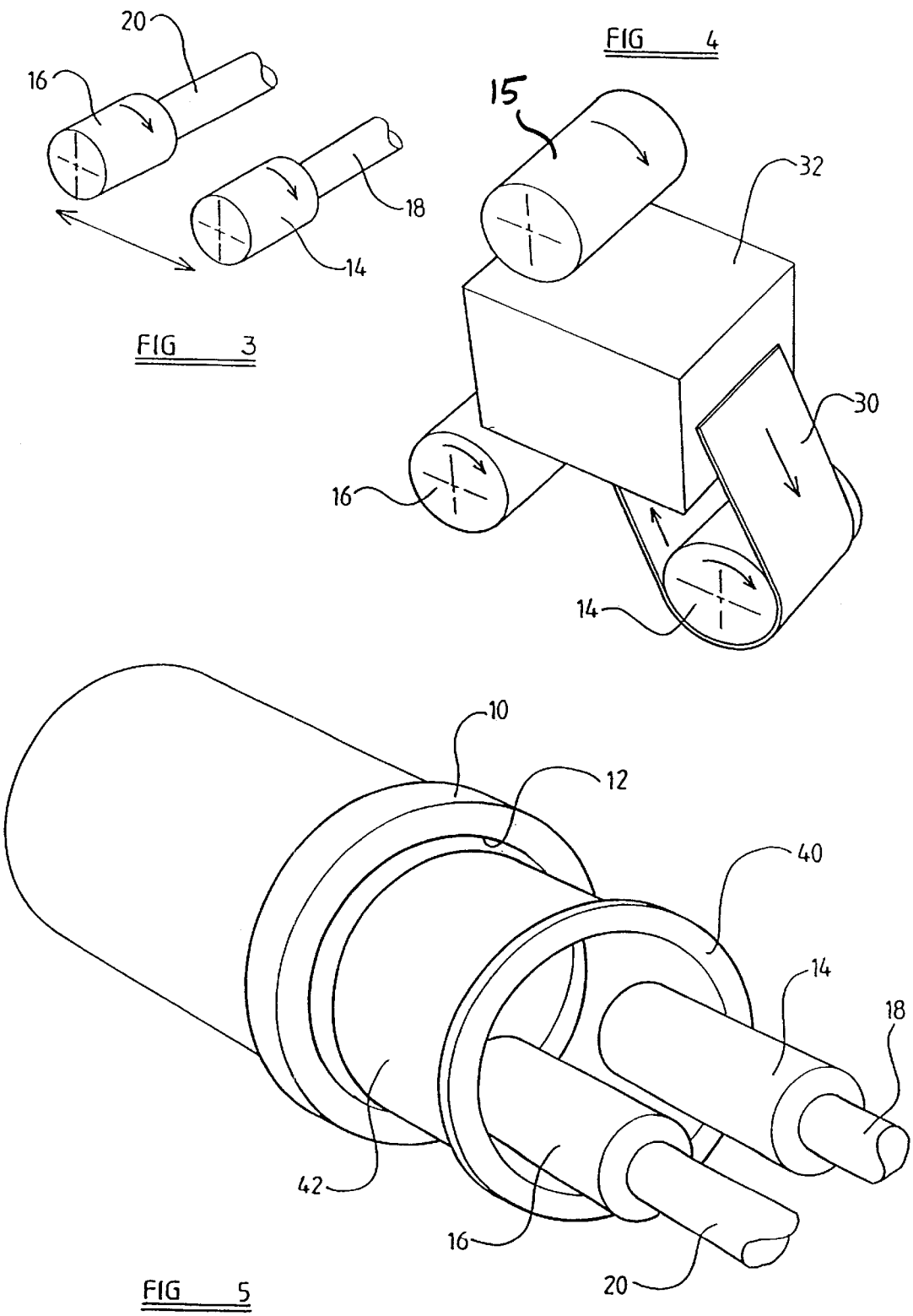

METHOD OF TREATING A SURFACE WITH HARD PARTICLES USING FREE RUNNING ROLLERS

RELATED APPLICATIONS

This is a continuation-in-part of Ser. No. 09/208,327, filed Dec. 9, 1998, which is now abandoned.

BACKGROUND TO THE INVENTION

The invention relates to the treatment of surfaces.

DESCRIPTION OF THE PRIOR ART

The treatment of bearing surfaces to provide surfaces with improved wear resistance is well known. It is also well known to lap metal surfaces making use of an abrasive powder composed of hard grains or grit particles, such as silicon carbide particles, to obtain the exact finished dimensions required. That is in lapping some material is removed to obtain those required dimensions. Further, it is well known that wear properties can be improved if such particles are embedded into surfaces. In some methods the impregnation of such particles into the surface is combined with the lapping. Details of the application of this combined technique to cylindrical bearing surfaces are provided in our prior Patent No. GB 1,372,171, and in respect of cylindrical and swept bearing surfaces in our prior Patent No. GB 1,574,141.

However, such methods described in the prior art generally, and in these earlier patents, suffer from a number of disadvantages, for example:

(a) large mounts of the abrasive powder and carrying media are wasted during the production process;

(b) the tooling used in the embedding process is in essence a consumable adding further to process cost, and (c) the process is difficult to automate due to a high level of manual intervention.

Many of the prior art methods for treating bearing surfaces also suffer from the disadvantage that in the course of treatment base material of the surface is cut or ground away thus dimensionally altering the component rather than just altering the properties of the surface. Such methods are for examples described in earlier patents assigned to the present assignee U.S. Pat. No. 3,171,189 and U.S. Pat. No. 3,961,104, and of North American Rockwell Corporation, U.S. Pat. No. 3,670,462 and of ING Walzlager Schaeffler KG, U.S. Pat. No. 4,567,695.

It is an object of the present invention to provide a new method of treating surfaces to provide improve wear resistance.

SUMMARY OF THE INVENTION

According to the present invention there is provided a method of treating a surface of a component formed from a base material, the method comprising the steps of bringing the surface into proximity with free running rollers, moving the surface relative to the free running rollers with a contact force in the range 5.25 to 20.00 Newtons per mm of roller width, and introducing particles of a higher relative hardness than the base material between the surface and the free running rollers, such that at least some of the particles are forced into the base material of the surface by the free running rollers without substantially dimensionally altering the component.

The invention provides a number of advantages. First, durable tooling is used with considerably longer life than the type used on the previous methods such as lapping, thus providing significant cost savings. Second, considerably less carrying media is used, thus providing a further reduction in processing cost but it also leading to reduced post process cleaning after treatment, providing yet further reduction in cost. Third, the force applied to the free running rollers introduces a degree of residual stress into the base material surface and this enhances hard particle retention. Fourth, highly localised areas may be treated on a surface providing improved wear characteristics only where required; eliminating the need to treat areas not required provides further cost savings. Fifth, the process may be readily automated and used in production line manufacturing, with obvious advantages. Sixth, relatively soft base materials, such as aluminium and aluminium alloys, can be treated without scoring or damaging the surface which is a problem when using the previous methods. Finally, non cylindrical surfaces may be treated, giving a much wider range of applications for this method.

Preferably the method also introduces a degree of residual stress into the base material of the surface.

The particles which are introduced, which for convenience will be described as "hard particles", may be introduced between the rollers and the surface in a slurry applied to the surface. Alternatively, the hard particles may be introduced by adhering them to the surface using a light adhesive.

In a further alternative the hard particles may be adhered to a tape using a light adhesive, and the tape passed around at least one of the free running rollers. The tape may be provided in the form of a cassette.

In yet a further alternative a mask may be manufactured to conform to the surface to be treated and the hard particles adhered to the surface of the mask, the mask then being brought into proximity with the surface, between the surface and the free running rollers.

Preferably the surface is rolled more than once such that the particles are fully embedded in the base material.

The method may comprise the further steps of removing excess hard particles and repeating the movement of the surface relative to the rollers with a contact force in the range 5.25 to 20.00 Newtons per mm of roller width, such that the hard particles previously forced into the surface base material are forced further into the base material and the base material closes around them.

The method may comprise a further step of subsequently using an abrasive to produce the desired surface finish and to remove any loose hard particles from the surface.

Preferably the hard particles are silicon carbide.

The surface may be an internal cylindrical surface with a longitudinal axis and the free running rollers may have longitudinal axes arranged to be parallel with the longitudinal axis of the surface.

BRIEF DESCRIPTION OF THE DRAWINGS

Methods of putting the invention into effect will now be described, by way of example only, with reference to the accompanying drawings in which:

FIG. 2 illustrates in cross-section the method of the invention in operation;

FIG. 3 illustrates a roller arrangement appropriate for slurry or other direct methods of introduction of hard particles;

FIGS. 4 and 5 illustrate roller arrangements appropriate for alternative methods of introduction of hard particles.

DESCRIPTION OF THE PREFERRED EMBODIMENTS

Figure 1:
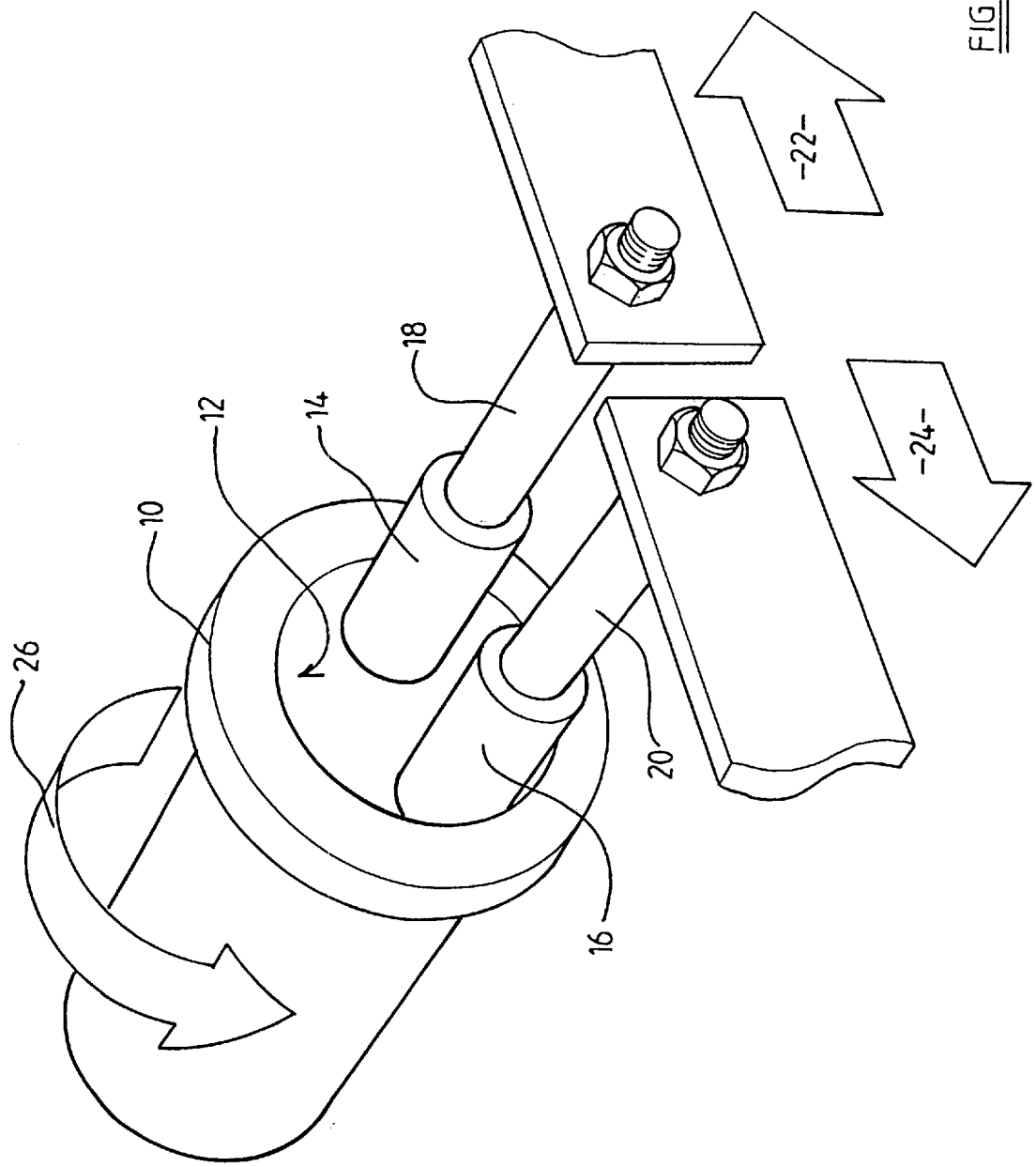
FIG. 1 schematically illustrates the application of the method to an internal cylindrical surface.

Referring now to the Figures, a component 10 formed from a base material bears an internal cylindrical surface 12 to be treated, in order to improve its wear characteristics. Two free running rollers 14,16, are provided for implementation of the treatment method. The free running rollers 14,16, are supported by rods 18,20, such that their longitudinal axes are parallel with the longitudinal axis of the component 10. The free running rollers 14,16, can be inserted into the component 10 and biased in opposite directions as shown by the arrows 22,24, such that they come into contact with the internal cylindrical surface 12 with a contact force in the range 5.25 to 20.00 Newtons per mm of roller width dependant on the base material being treated, the contact force being controllable. The bias is applied to the free running rollers 14, 16 by any appropriate method, such as hydraulically, pneumatically, or mechanically.

The component 10 is rotated in order to provide relative movement of the internal cylindrical surface 12 with respect to the free running rollers 14, 16. As the rotation of the surface 12 occurs, particles P having a relative hardness greater than that of the base material hereinafter referred to as "hard particles" for brevity, for example silicon carbide, are introduced between the free running rollers 14,16, and the surface 12 such that the hard particles P are forced into the base material of the surface 12, as illustrated in FIG. 2. The rotation is continued until the whole surface 12, or that portion of it being treated, has been rolled more than once, and preferably a number of times, such that the hard particles P are fully embedded in the base material.

This method differs from the prior art in which rollers are rotated when in contact with a surface being treated. In contrast, in the method of the invention the rollers are free running and simply pressed against the surface with sufficient force such that when the surface is moved the rollers are rotated by friction. Further all prior art methods, such as cutting and lapping, are such that base material is removed from the surface being treated and the component is dimensionally altered. In the method of the present invention substantially no base material is removed and the component is not dimensionally altered.

The extent of the embedding or impregnation of the hard particles P into the base material being treated may be determined by one or more of the following methods, as appropriate for the base material being treated and the hard particles being embedded:

a) SEM X-ray mapping (assuming hard particles have distinctive chemical composition to base material);
b) optical Microscopy;
c) destructive cross sectioning, or
d) Beta particle diffraction.

The contact force between the free running rollers 14,16, and the cylindrical surface 12 is closely controlled in order to introduce a degree of residual stress into the base material of the surface 12 being treated, as this enhances hard particles retention.

In most cases, the method involves further steps as follows. Any excess and loose hard particles P are removed from the component 10 and free running rollers 14,16, and further rolling, as described above, is undertaken with the same range of contact forces but without the introduction of further hard particles. This ensures that the hard particles P introduced into the base material of the surface 12 are pressed further into the surface and the material is closed tightly over or around them.

Depending on the component 10 being treated, a further final operation using prior art techniques may be used to achieve the desired surface finish, and to remove any loose hard particles may be undertaken. For example the surface 12 may be honed using abrasives. This is particularly suitable for example when a cylinder bore is being treated.

There are a number of options for the manner of introduction of the hard particles P between the surface 12 and the free running rollers 14,16, each having different benefits and particular instances where it is applicable.

The first option for introducing the hard particles P, is to mix them with a carrier fluid to form a slurry which preferably has an even and predetermined concentration of hard particles. The slurry is applied to the cylindrical surface 12 of the component 10 before rolling, or may be fed at a controlled rate in front of the free running rollers 14,16, dependent on the format of the component 10 to be treated. For this method of introduction, free running rollers of the form illustrated in FIG. 3 are appropriate.

The next method of introduction of the hard particles again uses rollers of the configuration illustrated in FIG. 3. In this case, the hard particles are fixed with a light adhesive, in a controlled manner and density, to the portion of the surface 12 to be treated. Any excess is removed after the rolling operation, using an appropriate solvent for the adhesive if necessary.

The third manner of introduction of the hard particles uses apparatus as illustrated in FIG. 4. The hard particles are fixed in a controlled manner and density by a light adhesive to a tape 30, which is preferably provided in a cassette 32. The tape is then fed over one or more of the rollers 14,15,16, which in turn presses the tape 30 against the surface 12 to be treated. This results in the hard particles being pressed into the base material of the surface 12 and hence being removed from the tape 30. The remaining free running roller or rollers 14,15,16, then press the hard particles into the base material, ensuring that the base material closes over them as required. This particular option provides the benefit that few excess hard particles are introduced. This thus reduces the problems which can result from excess hard particles which fail to be washed off intricate components with many holes and pockets, such as for example cylinder blocks.

The fourth option uses rollers as illustrated in FIG. 5. In this case, a mask 40 is made especially to conform to the surface 12 to be treated and the hard particles are fixed to the appropriate face or faces of it, 42, in a predetermined pattern and density according to the treatment required. The mask 40 is then placed in proximity with the area of the surface 12 to be treated and the rolling process is carried out. Following the rolling, the mask 40 may be removed before a possible second rolling operation is conducted to complete the submerging of the hard particles into the material of the surface 12.

Whilst the method is described above with reference to the use of two or three free running rollers, additional free running rollers may be used if desired. The rollers may treat a portion of the surface the width of the rollers, or the rollers may be moved axially with respect to the component 10, or vice versa, in order that a larger area of the surface is treated.

The examples given above relate to the processing of internal cylindrical surfaces. However, the method of the invention is suitable for the treatment of most surface geometry's and is not limited to the treatment of cylindrical surfaces.

The features disclosed in the foregoing description the following claims or the accompanying drawings, expressed in their specific forms or in terms of a means for performing the disclosed function, or a method or process for attaining the disclosed result, or a class or group of substances or compositions, as appropriate, may, separately, or in any combination of such features, be utilised for realising the invention in diverse forms thereof.

What is claimed is:

1. A method of treating a surface of a component formed from a base material, comprising the steps of bringing the surface into proximity with free running rollers, moving the surface relative to the free running rollers while pressing the free running rollers and the surface against each other with a force in the range 5.25 to 20.00 Newtons per mm of roller width, and introducing particles of a higher relative hardness than the base material between the free running rollers and the surface such that at least some of the particles are at least partially forced into the base material of the surface by the free running rollers without substantially dimensionally altering the component.

2. A method according to claim 1 wherein the force between the free running rollers and the surface introduces a degree of residual stress into the base material of the surface.

3. A method according to claim 1 wherein the step of introducing the particles further comprises introducing the particles between the free running rollers and the surface in a slurry applied to the surface.

4. A method according to claim 3 wherein the step of introducing the particles further comprises introducing the slurry at a position just in front of the free running rollers as the surface moves relative to them.

5. A method according to claim 1 wherein the step of introducing the particles further comprises introducing the particles between the free running rollers and the surface by adhering them to the surface using a light adhesive.

6. A method according to claim 1 wherein the step of introducing the particles further comprises introducing the particles between the free running rollers and the surface by adhering them to a tape using a light adhesive, and passing the tape around at least one of the free running rollers such that the particles are between the surface and the tape.

7. A method according to claim 6 wherein the tape is provided in the form of a cassette.

8. A method according to claim 1 wherein the step of introducing the particles further comprises introducing the particles between the free running rollers and the surface by manufacturing a mask which conforms to the surface to be treated and adhering the particles to a surface of the mask, and bringing the mask into proximity with the surface to be treated such that the particles are between the mask and the surface to be treated.

9. A method according to claim 1 wherein the step of moving the surface relative to the free running rollers is performed more than once such that the particles are fully embedded within the base material of the surface.

10. A method according to claim 1 further comprising the steps of removing any excess particles from the surface and the free running rollers and again moving the surface relative to the free running rollers while pressing the free running rollers and the surface against each other with a force in the range of 5.25 to 10.00 Newtons per mm of roller width such that the particles are forced further into the base material of the surface and the base material closes around them.

11. A method according to claim 10 further comprising the step of subsequently using an abrasive to produce a desired finish on the surface and to remove any loose particles from the surface.

12. A method according to claim 10 wherein the particles are silicon carbide.

13. A method according to claim 1 wherein the surface is an internal cylindrical surface having a longitudinal axis and the free running rollers have longitudinal axes arranged to be parallel with the longitudinal axis of the surface.

* * * * *